United States Patent
Mironets et al.

(10) Patent No.: US 10,527,027 B2
(45) Date of Patent: Jan. 7, 2020

(54) IN-SITU STRESS CONTROL IN STRUCTURES

(71) Applicant: Delavan Inc, West Des Moines, IA (US)

(72) Inventors: Sergey Mironets, Charlotte, NC (US); Alexander Staroselsky, Avon, CT (US); Robert Bianco, Bloomfield, CT (US)

(73) Assignee: DELAVAN INC., West Des Moines, IA (US)

( * ) Notice: Subject to any disclaimer, the term of this patent is extended or adjusted under 35 U.S.C. 154(b) by 408 days.

(21) Appl. No.: 15/433,792

(22) Filed: Feb. 15, 2017

(65) Prior Publication Data

US 2018/0230974 A1    Aug. 16, 2018

(51) Int. Cl.
*F03G 7/06* (2006.01)
*G01L 1/26* (2006.01)
*B64C 25/00* (2006.01)

(52) U.S. Cl.
CPC ............... *F03G 7/065* (2013.01); *G01L 1/26* (2013.01); *B64C 25/001* (2013.01)

(58) Field of Classification Search
CPC ........ B64C 25/00; B64C 25/24; B64C 25/001
See application file for complete search history.

(56) References Cited

U.S. PATENT DOCUMENTS

| | | |
|---|---|---|
| 8,465,847 B2 | 6/2013 | Shaw et al. |
| 9,101,979 B2 | 8/2015 | Hofmann et al. |
| 9,492,296 B2 | 11/2016 | Pasini et al. |
| 2002/0088110 A1* | 7/2002 | Arms ............. G01B 7/24 29/606 |
| 2005/0194815 A1* | 9/2005 | Mc Knight ....... B62D 35/00 296/180.5 |
| 2014/0037873 A1 | 2/2014 | Cheung et al. |
| 2015/0056464 A1 | 2/2015 | Brice |
| 2016/0135537 A1 | 5/2016 | Wawrousek et al. |
| 2016/0145968 A1 | 5/2016 | Marya |
| 2016/0258248 A1* | 9/2016 | MacDonald ......... E21B 17/02 |
| 2018/0112554 A1* | 4/2018 | Ghosh ................ F16C 35/077 |
| 2018/0245621 A1* | 8/2018 | Bogrash ............. F16B 39/24 |

FOREIGN PATENT DOCUMENTS

JP    2011152919 A  *  8/2011

OTHER PUBLICATIONS

Partial Extended Search Report dated Jul. 13, 2018, prepared, of the European Patent Office, issued in corresponding European Patent Application No. 18156765.2.
Extended European Search Report prepared, of the European Patent Office, dated Oct. 15, 2018, in corresponding European Patent Application No. 18156765.2.

* cited by examiner

*Primary Examiner* — Philip J Bonzell
*Assistant Examiner* — Tye William Abell
(74) *Attorney, Agent, or Firm* — Locke Lord LLP; Daniel J. Fiorello; Scott D. Wofsy

(57) ABSTRACT

In accordance with at least one aspect of this disclosure, a structure can include a first body formed from a first material, and a second body disposed on or embedded within the first body. The second body includes a shape memory alloy configured to provide a first stress to the first body in a first state and a second stress to the first body in a second state. The shape memory alloy is configured to transition from the first and second state as a function of an applied activation energy.

17 Claims, 2 Drawing Sheets

Primary Fracture Area
Secondary Fracture Area

IN-SITU STRESS CONTROL IN STRUCTURES

BACKGROUND

1. Field

The present disclosure relates to stress compensating techniques, more specifically to selective mitigation or cancellation of excessive stresses in structures, e.g., subjected to complex stress-strain conditions.

2. Description of Related Art

There are many rules implemented in the aerospace industry to prevent failures including periodic component inspection or failure specific type of periodic maintenance, as well as sensor technology, continuous monitoring of systems status, and others. These rules and technologies are utilized to manage system health performance affected by environmental, thermo-mechanical fatigue, and other factors that are not always accurately predicted during component design and testing. Although these methods and approaches are considered reliable, they do not have the capability of, for example, in-situ offsetting excessive local stresses especially in components subjected to very complex stress-strain conditions.

Such conventional methods and systems have generally been considered satisfactory for their intended purpose. However, there is still a need in the art for improved stress relief structures. The present disclosure provides a solution for this need.

SUMMARY

In accordance with at least one aspect of this disclosure, a structure can include a first body formed from a first material, and a second body disposed on or embedded within the first body. The second body includes a shape memory alloy configured to provide a first stress to the first body in a first state and a second stress to the first body in a second state. The shape memory alloy is configured to transition from the first and second state as a function of an applied activation energy (e.g., thermal, mechanical, electrical, or magnetic).

The first stress can be none, compressive or tensile and the second stress can be none, compressive, or tensile, or any suitable combinations thereof. The first stress may be compressive, and the second stress may be tensile, and vice versa for example. The second stress can be greater than the first stress (e.g., after for example an external thermal energy is applied). In certain embodiments, the first stress can be zero and the second stress can be greater than zero. The first stress can be greater than the second stress. In certain embodiments, the first stress can be greater than zero and the second stress can be zero.

The second body can be located in a high stress location of the structure such that the second body can be transitioned between the first state and the second state to apply a stress relieving force at the high stress location of the structure to prevent material fatigue of the first body. Any other suitable location is contemplated herein.

The structure can be a landing gear strut or any other suitable structure. For example, the second body can be disposed within a lug of the landing gear strut at a maximum stress location to generate internal stresses to reducing a first principal stress (e.g., a tensile stress) in the structure, e.g., with an intensity approaching the first principle stress but in the opposite direction. The second body can include a first shape in the first state and a second shape in the second state such that the second body is configured to apply a predetermined compressive or tensile force on the first body in at least one of the first and/or second state.

The first shape and/or second shape can include an I-beam shape, for example, or any other suitable shape to induce internal stresses. The first shape and/or second shape can include a network of cellular or lattice configuration with a predetermined stiffness and residual plastic strain placed on structure's surface or embedded in a subsurface of a structure. In certain embodiments, the shape memory alloy includes Ni—Ti—X alloys or Cu-based shape memory alloys or shape memory alloy ceramics, or any other suitable shape memory material.

In accordance with at least one aspect of this disclosure, a system can include a structure as described herein a sensor (e.g., a strain sensor, a virtual sensor based on certain boundary conditions) configured to sense a stress of the first body, an activation energy source operatively connected to second body, and a controller operatively connected to the sensor and the activation energy source and configured to apply and/or remove the activation energy to the second body based on signals from the sensor to cause the second body to transition between the first state and the second state. Any other suitable components to the system are contemplated herein.

A method includes causing a second body to change state relative to a first body to cause the second body to provide to apply a stress relieving force at the high stress location of the first body to prevent material fatigue of the first body.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
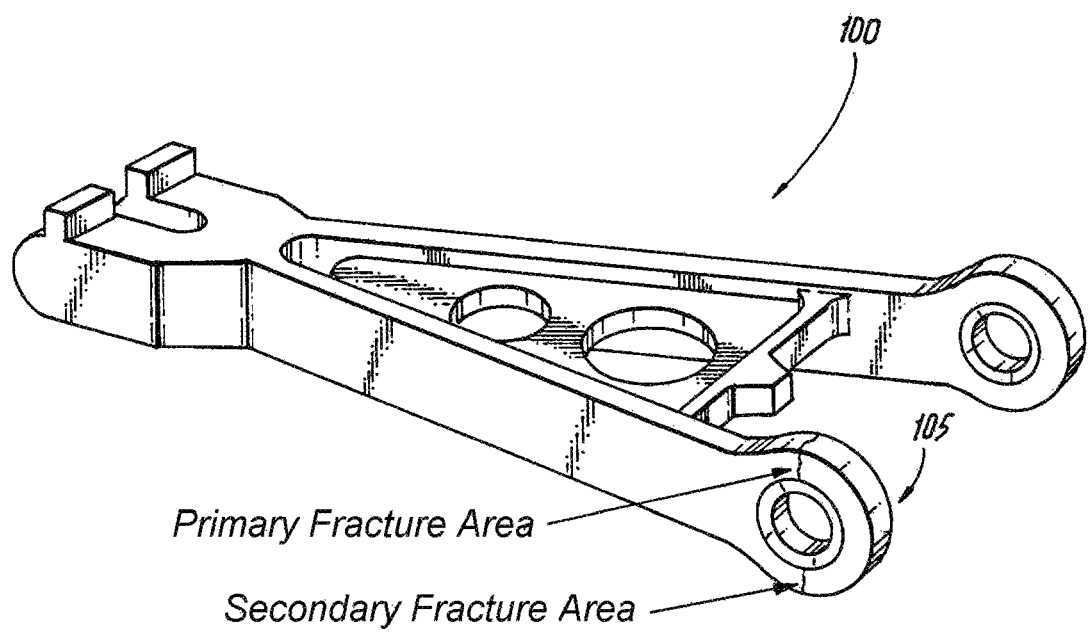
FIG. 1 is a perspective view of an embodiment of a structure in accordance with this disclosure.

Reference will now be made to the drawings wherein like reference numerals identify similar structural features or aspects of the subject disclosure. For purposes of explanation and illustration, and not limitation, an illustrative view of an embodiment of a structure in accordance with the disclosure is shown in FIG. 1 and is designated generally by reference character 100. Other embodiments and/or aspects of this disclosure are shown in FIGS. 2-5. The systems and methods described herein can be used to improve serviceable life of structures exposed to complex stresses, for example.

Figure 2:
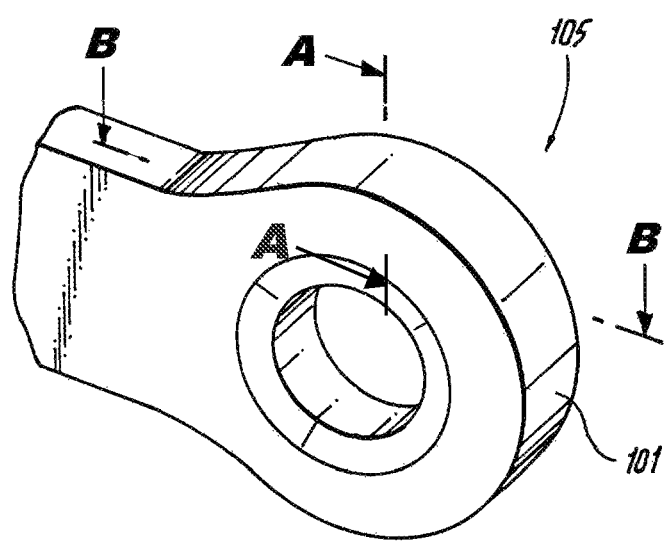
FIG. 2 is a perspective view of a portion of the embodiment of FIG. 1.
Figure 3:
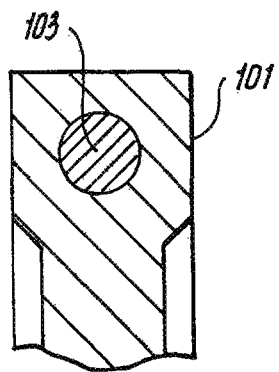
FIG. 3 is a portion of the cross-sectional view of the embodiment of FIG. 2, along line A-A.
Figure 4:
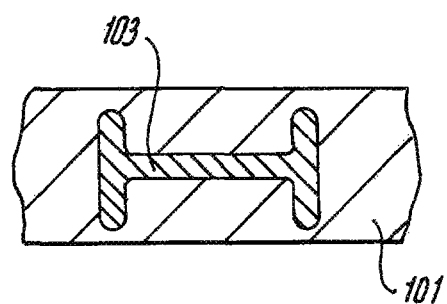
FIG. 4 is a cross-sectional view of the embodiment of FIG. 2, along line B-B.

Referring to FIGS. 1 and 2, a structure 100 can include a first body 101 formed from a first material (e.g., metal or any other suitable material). Referring additionally to FIGS. 3, and 4, the structure includes a second body 103 disposed on or embedded within the first body 101. The second body 103 includes a shape memory alloy configured to provide a first stress to the first body 101 in a first state and a second stress to the first body 101 in a second state. The shape memory alloy is configured to transition from the first state and second state as a function of an applied activation energy (e.g., electric current, electric field, magnetic field, heat).

The second stress can be greater than the first stress, for example (e.g., for applications where additional stress to the first body 101 is desired to counteract external stresses acting on the first body 101). In certain embodiments, the first stress can be zero and the second stress can be greater than zero.

In certain cases, the first stress can be greater than the second stress (e.g., for application where removal of stress is desired to counteract external stresses). In certain embodiments, the first stress can be greater than zero and the second stress can be zero. In either case, it is contemplated that the stress can be negative (e.g., otherwise referred to as tensile stress) in the first state and/or second state.

Any suitable relative stresses caused by the second body 103 in the first state and/or second state which acts on the first body 101 are contemplated herein. For example, multiple second bodies 103 can be used to create a predetermined net stress in the first body 101 in any suitable manner and/or intensity. Thus, a value of stress might be different in different locations of the first body 101 using combination of stresses from multiple second bodies 103.

The first stress can be none, compressive or tensile and the second stress can be none, compressive, or tensile, or any suitable combinations thereof. The first stress may be compressive, and the second stress may be tensile, and vice versa for example.

The second body 103 can be located in a high stress location of the structure 100 such that the second body 103 can be transitioned between the first state and the second state to apply a stress relieving force at the high stress location of the structure 100. This can prevent material fatigue (e.g., cracking) of the first body 101 at the high stress location. Any other suitable location for the second body 103 is contemplated herein.

The structure 100 can be a landing gear strut (e.g., as shown) or any other suitable structure. For example, the second body 103 can be disposed within a lug 105 (e.g., as shown in FIG. 2) of the landing gear strut. The second body 103 can be disposed at a maximum stress location (e.g., primary fracture area as shown) to provide stress relief to prevent cracking of the lug 105, for example. Any other suitable location in addition or in the alternative is contemplated herein (e.g., at the secondary fracture area as shown).

The second body 103 can include a first shape in the first state and a second shape in the second state such that the second body 103 is configured to apply a predetermined compressive or tensile force on the first body 101 in at least one of the first and/or second state. For example, the dimensions and/or volume of the second body 103 can change between the first state and the second state. There may be one or more first states and/or second states, and the states may be discrete or continuous.

The second body 103 may be formed on and/or around the first body 101 in certain embodiments. Any other suitable configuration is contemplated herein.

The first shape and/or second shape can include an I-beam shape (e.g., as shown in FIG. 4, e.g., a curved I-beam that travels around the opening in the first structure), for example, or any other suitable shape (e.g., a helix, a cellular (lattice) structure). Any shape for the second body 103 is contemplated herein.

The second body 103 can be configured to expand and contract in any suitable direction(s). In certain embodiments, the second body 103 can expand in only a preferred stress direction.

The structure 100 and/or any suitable portion thereof can be additively manufactured. For example, the second body 103 can be printed integrally into the first body 101 (e.g., using multiple materials during printing). In certain embodiments, one or more grooves can be machined into the first body 101 and then the second body 103 can be inserted into the grooves. lattice structure wherever stress location. Any other suitable manufacturing method is contemplated herein.

In certain embodiments, the shape memory alloy can include Ti—Ni alloy, or any other suitable shape memory material. The shape memory alloy can be selected based on intended use so that it is configured to function at an expected temperature experienced by the structure 100. Any suitable weldable material (e.g., for additive manufacturing) for the shape memory alloy is contemplated herein.

Figure 5:
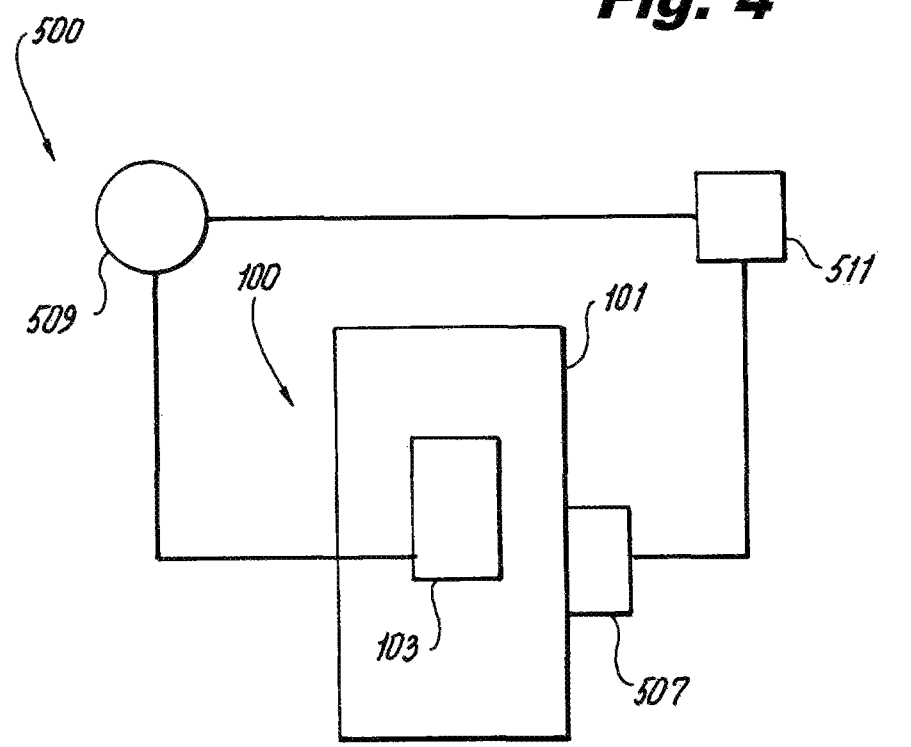
FIG. 5 is a schematic view of an embodiment of a system in accordance with this disclosure.

Referring to FIG. 5, a system 500 can include a structure 100 as described above and a sensor 507 configured to sense a stress of the first body 101. The sensor 507 can include any suitable type of sensor (e.g., a strain sensor, a virtual sensor). For example, virtual sensors can be used to calculate stresses based on certain boundary conditions. Surface displacement can be measured and location of high stress areas where stress reduction is desired can be determined. The system 500 can also include an activation energy source 509 (e.g., a battery) operatively connected to second body 103 (e.g., directly through electrical wiring and/or indirect wireless electromagnetic communication).

The system 500 can also include a controller 511 operatively connected to the sensor 507 and the activation energy source 509. The controller 511 can be configured to apply and/or remove the activation energy to the second body 103 based on signals from the sensor 507 to cause the second body 103 to transition between the first state and the second state. Any other suitable components to the system 500 are contemplated herein.

A method can include sensing a stress on a first body (e.g., using a virtual sensor, a physical sensor, and/or using experimental and/or analytical data). The method also includes applying an activation energy to a second body based on sensed stress and/or the analytically or experimentally determined stress to cause the second body to provide a counteracting stress to the first body. The method can be embodied as computer executable instructions, for example.

As described above, the system 500 can selectively apply energy to control the state of the shape memory alloy to provide counteracting stresses within the structure of a stressed component (e.g., landing gear).

Embodiments can deliver controllable stresses in excess of 1500 megapascals (MPa), for example. Certain shape memory alloy compositions can also be tunable to multiple activation temperatures (e.g., up to 400° C.), depending on the usage environments.

Embodiments can include additively manufactured network of cellular structures that can include variable cell density to apply forces in a more controlled way, for example. Each network can cover specific component areas and be locally activated only when sensors detect excessive stresses. That way, shape memory alloys can counterbalance only locally induces stresses preserving other external areas for optimal performance.

Embodiments can be printed on the component surface or embedded in components subsurface, for example. The shape memory alloy cellular structure can be implemented in the functionally graded materials combining largely different materials, such as metals and ceramics in order to provide strength and ductility at the same time, for example. In certain embodiments, challenges of difference of coefficient of thermal expansion at the interface can be addresses by embedding cellular shape memory alloy structure, which can induce additional stresses thereby extending the threshold of interface fracture.

In embodiments, the stresses activation time can be synchronized with a sensor(s) feedback (e.g., taking into consideration the lag time for the shape memory alloy response). In certain embodiments, shape memory alloy cellular structure can be implemented between contacting surfaces to instantaneously modify pressure distribution and magnitude of local forces applied.

The methods and systems of the present disclosure, as described above and shown in the drawings, provide for active stress relief structures with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A structure, comprising:
    a first body formed from a first material; and
    a second body disposed on or embedded within the first body, the second body comprising a shape memory alloy configured to exert a first stress to the first body in at least one first state and a second stress to the first body in at least one second state, wherein the shape memory alloy is configured to transition between the first and second state as a function of an applied activation energy;
    wherein the structure is a landing gear strut, and the second body is formed within a lug of the landing gear strut at a maximum stress location to provide stress relief to prevent cracking of the lug.

2. The structure of claim 1, wherein the shape memory alloy includes a nickel and titanium alloy.

3. The structure of claim 1, wherein the activation energy can be at least one of thermal, electrical, or magnetic.

4. The structure of claim 1, wherein the second stress is greater than the first stress.

5. The structure of claim 4, wherein the first stress is zero and the second stress is greater than zero.

6. The structure of claim 1, wherein the first stress is greater than the second stress.

7. The structure of claim 6, wherein the first stress is greater than zero and the second stress is zero.

8. The structure of claim 1, wherein the second body is located in a first stress location of the structure such that the second body can be transitioned between the first state and the second state to apply a stress relieving force at the first stress location of the structure to prevent material fatigue of the first body, the first stress location having a greater stress than the structure.

9. The structure of claim 1, wherein the second body includes a first shape in the first state and a second shape in the second state such that the second body is configured to apply a predetermined compressive or tensile force on the first body in at least one of the first and/or second state.

10. The structure of claim 9, wherein the first shape and/or second shape includes an I-beam shape.

11. A system, comprising:
    a structure, comprising:
    a first body formed from a first material; and
    a second body disposed on or embedded within the first body, the second body comprising a shape memory alloy configured to exert a first stress to the first body in at least one first state and a second stress to the first body in at least one second state, wherein the shape memory alloy is configured to transition between the first and second state as a function of an applied activation energy;
    wherein the structure is a landing gear strut, and the second body is formed within a lug of the landing gear strut at a maximum stress location to provide stress relief to prevent cracking of the lug;
    a sensor configured to sense a stress of the first body;
    an activation energy source operatively connected to second body; and
    a controller operatively connected to the sensor and the activation energy source and configured to apply and/or remove the activation energy to the second body based on signals from the sensor to cause the second body to transition between the first state and the second state.

12. The system of claim 11, wherein the second body is located in a first stress location of the structure such that the second body can be transitioned between the first state and the second state to apply a stress relieving force at the first stress location of the structure to prevent material fatigue of the first body, the first stress location having a greater stress than the structure.

13. The system of claim 11, wherein the second stress is greater than the first stress.

14. The system of claim 13, wherein the first stress is zero and the second stress is greater than zero.

15. The system of claim 11, wherein the first stress is greater than the second stress.

16. The system of claim 15, wherein the first stress is greater than zero and the second stress is zero.

17. A method, comprising:
    causing a second body to change state relative to a first body to cause the second body to apply a stress relieving force at a first stress location of the first body to prevent material fatigue of the first body, the first stress location having a greater stress than the first body;
    wherein the first body is a landing gear strut, and the second body is formed within a lug of the landing gear strut at the first stress location.

* * * * *